US012645128B2

(12) United States Patent

Suzuki

(10) Patent No.: US 12,645,128 B2

(45) Date of Patent: Jun. 2, 2026

(54) SEMICONDUCTOR OPTICAL INTEGRATED DEVICE AND OPTICAL INTEGRATED APPARATUS

(71) Applicant: Mitsubishi Electric Corporation, Tokyo (JP)

(72) Inventor: Yosuke Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 213 days.

(21) Appl. No.: 18/564,627

(22) PCT Filed: Jun. 4, 2021

(86) PCT No.: PCT/JP2021/021334

§ 371 (c)(1),
(2) Date: Nov. 28, 2023

(87) PCT Pub. No.: WO2022/254687

PCT Pub. Date: Dec. 8, 2022

(65) Prior Publication Data

US 2024/0272511 A1 Aug. 15, 2024

(51) Int. Cl.
*G02F 1/21* (2006.01)
*G02F 1/01* (2006.01)
*G02F 1/225* (2006.01)

(52) U.S. Cl.
CPC ............ *G02F 1/217* (2021.01); *G02F 1/0147* (2013.01); *G02F 1/2257* (2013.01)

(58) Field of Classification Search
None
See application file for complete search history.

(56) References Cited

U.S. PATENT DOCUMENTS

| | | | |
|---|---|---|---|
| 6,353,694 | B1 | 3/2002 | Paiam |
| 2013/0182730 | A1 | 7/2013 | Fan et al. |
| 2013/0322808 | A1 | 12/2013 | Yagi |
| 2015/0236473 | A1 | 8/2015 | Lee et al. |
| 2022/0360040 | A1* | 11/2022 | Wakaba .................. H01S 5/125 |

FOREIGN PATENT DOCUMENTS

| | | |
|---|---|---|
| JP | 2011-175109 A | 9/2011 |
| JP | 2012-173707 A | 9/2012 |
| JP | 2013-250527 A | 12/2013 |

(Continued)

OTHER PUBLICATIONS

International Search Report and Written Opinion mailed on Aug. 10, 2021, received for PCT Application PCT/JP2021/021334, filed on Jun. 4, 2021, 10 pages including English Translation.

(Continued)

*Primary Examiner* — Chad H Smith

(74) *Attorney, Agent, or Firm* — XSENSUS LLP

(57) ABSTRACT

A semiconductor optical integrated device includes a substrate, an MMI waveguide, an organic insulating layer, and a heater layer. The MMI waveguide is provided on the substrate and is formed of a semiconductor material. The MMI waveguide includes a first side surface and a second side surface opposite to the first side surface. The organic insulating layer buries the first side surface and the second side surface. The heater layer is capable of heating the organic insulating layer.

15 Claims, 8 Drawing Sheets

(56)          References Cited

FOREIGN PATENT DOCUMENTS

| | | | |
|---|---|---|---|
| JP | 2016-219493 | A | 12/2016 |
| JP | 2017-201648 | A | 11/2017 |
| JP | 2018-028623 | A | 2/2018 |
| JP | 6530631 | B2 | 6/2019 |
| WO | 03/016957 | A2 | 2/2003 |

OTHER PUBLICATIONS

Notice of Reasons for Refusal mailed on Nov. 24, 2021, received for JP Application 2021-562893, 7 pages including English Translation.
Office Action issued Mar. 31, 2026, in Chinese Patent Application No. 202180098782.5, 15pp.

\* cited by examiner

Figure 12:
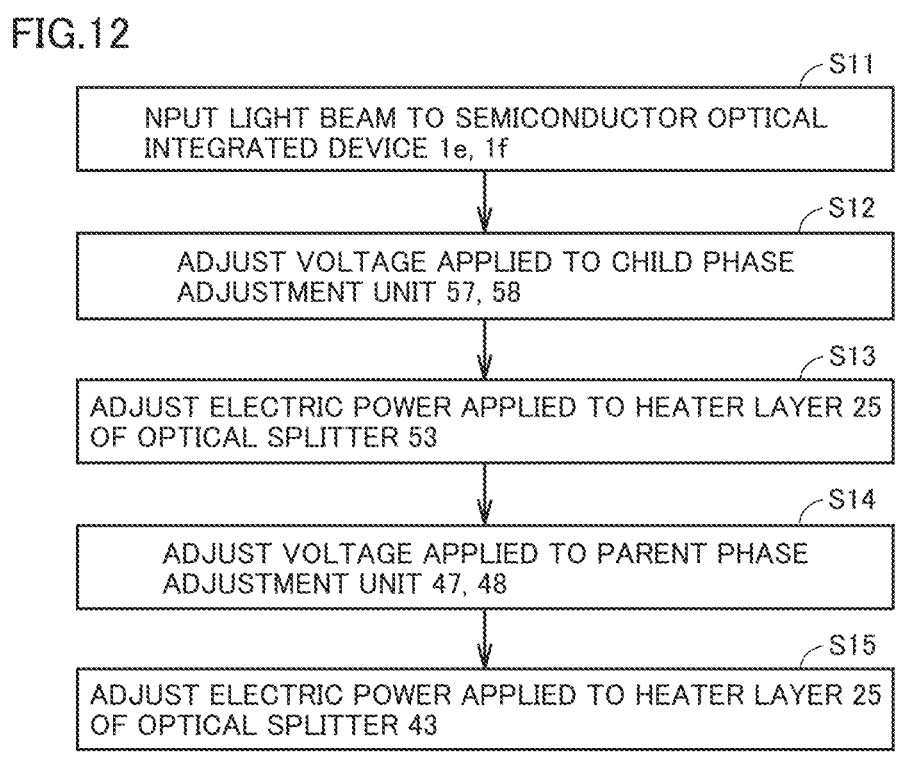

INPUT LIGHT BEAM TO SEMICONDUCTOR OPTICAL
INTEGRATED DEVICE 1e, 1f

S12

ADJUST VOLTAGE APPLIED TO CHILD PHASE
ADJUSTMENT UNIT 57, 58

S13

ADJUST ELECTRIC POWER APPLIED TO HEATER LAYER 25
OF OPTICAL SPLITTER 53

S14

ADJUST VOLTAGE APPLIED TO PARENT PHASE
ADJUSTMENT UNIT 47, 48

S15

ADJUST ELECTRIC POWER APPLIED TO HEATER LAYER 25
OF OPTICAL SPLITTER 43

SEMICONDUCTOR OPTICAL INTEGRATED DEVICE AND OPTICAL INTEGRATED APPARATUS

CROSS-REFERENCE TO RELATED APPLICATION

This application is based on PCT filing PCT/JP2021/021334, filed Jun. 4, 2021, the entire contents of which are incorporated herein by reference.

TECHNICAL FIELD

The present disclosure relates to a semiconductor optical integrated device and an optical integrated apparatus.

BACKGROUND ART

Japanese Patent Laying-Open No. 2013-250527 (PTL 1) discloses a semiconductor Mach-Zehnder modulator. The semiconductor Mach-Zehnder modulator includes two arm waveguides, a 2×2 multi-mode interference (MMI) optical splitter connected to the two arm waveguides, and a 2×2 MMI optical coupler connected to the two arm waveguides. The two arm waveguides, the 2×2 MMI optical splitter, and the 2×2 MMI optical coupler are formed of a semiconductor material, such as InP, and have a high-mesa structure. The two arm waveguides, the 2×2 MMI optical splitter, and the 2×2 MMI optical coupler are buried by a burying layer formed of an organic insulating material, such as a benzo-cyclobutene (BCB) resin.

CITATION LIST

Patent Literature

PTL 1: Japanese Patent Laying-Open No. 2013-250527

SUMMARY OF INVENTION

Technical Problem

A large stress is applied from the burying layer to an MMI waveguide (MMI optical splitter, MMI optical coupler) formed of the semiconductor material due to a difference between the coefficient of thermal expansion of the MMI waveguide and the coefficient of thermal expansion of an organic insulating resin material. This stress may change the refractive index of the MMI waveguide, resulting in deviations in optical characteristics of the semiconductor optical integrated device, such as an optical branching ratio of the MMI optical splitter and an optical coupling ratio of the MMI optical coupler, from target optical characteristics of the semiconductor optical integrated device. Also, the optical characteristics of the semiconductor optical integrated device may deviate from the target optical characteristics of the semiconductor optical integrated device due to a manufacturing error of the semiconductor optical integrated device (e.g., a dimensional error of the MMI waveguide and a compositional deviation of the MMI waveguide).

The present disclosure has been made in view of the above problems. An object of a first aspect of the present disclosure is to provide a semiconductor optical integrated device that can reduce or eliminate deviations in optical characteristics of the semiconductor optical integrated device from target optical characteristics. An object of a second aspect of the present disclosure is to provide an optical integrated apparatus that can reduce or eliminate deviations in optical characteristics of the optical integrated apparatus from target optical characteristics.

Solution to Problem

A semiconductor optical integrated device according to the present disclosure includes a substrate, a multi-mode interference waveguide, an organic insulating layer, and a heater layer. The multi-mode interference waveguide is provided on the substrate and is formed of a semiconductor material. The multi-mode interference waveguide includes a lower surface facing the substrate, an upper surface opposite to the lower surface, a first side surface connected to the upper surface, and a second side surface connected to the upper surface and opposite to the first side surface. The organic insulating layer buries the first side surface and the second side surface. The heater layer is capable of heating the organic insulating layer.

An optical integrated apparatus of the present disclosure includes the semiconductor optical integrated device of the present disclosure, and a controller capable of controlling electric power supplied to the heater layer.

Advantageous Effects of Invention

As the organic insulating layer is heated with the heater layer, the organic insulating layer thermally expands to apply a stress to the multi-mode interference waveguide. The refractive index of the multi-mode interference waveguide changes due to this stress. Thus, in the semiconductor optical integrated device according to the present disclosure, deviations in the optical characteristics of the semiconductor optical integrated device from target optical characteristics can be reduced or eliminated. In the optical integrated apparatus according to the present disclosure, deviations in the optical characteristics of the optical integrated apparatus from the target optical characteristics can be reduced or eliminated.

BRIEF DESCRIPTION OF DRAWINGS

FIG. 12 is a flowchart showing a method of controlling a semiconductor optical integrated device of Embodiment 4 and a variation thereof.

DESCRIPTION OF EMBODIMENTS

Figures 1, 2:
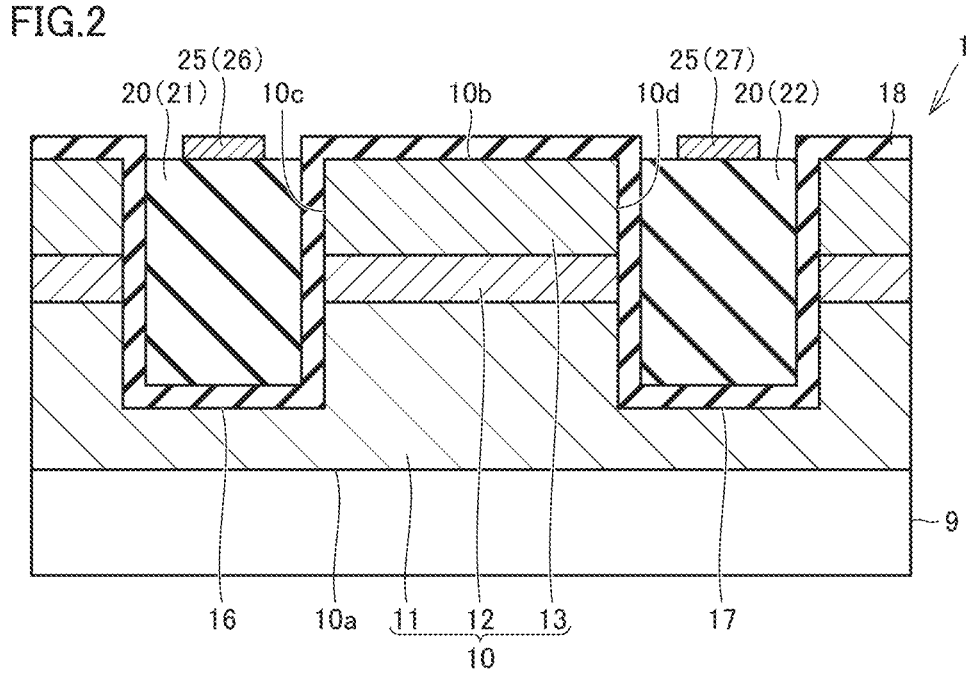
FIG. 1 is a schematic plan view of a semiconductor optical integrated device of Embodiment 1.
FIG. 2 is a schematic sectional view of the semiconductor optical integrated device of Embodiment 1, which is taken along the sectional line II-II shown in FIG. 1.

Embodiments of the present disclosure will now be described. The same or corresponding components have the same reference characters allotted, and description thereof will not be repeated.

Embodiment 1

A semiconductor optical integrated device 1 of Embodiment 1 will be described with reference to FIGS. 1 and 2. Semiconductor optical integrated device 1 mainly includes a substrate 9, input waveguides 31, a multi-mode interference (MMI) waveguide 10, output waveguides 32, a first inorganic insulating layer 18, an organic insulating layer 20, and a heater layer 25. Semiconductor optical integrated device 1 may further include pad electrodes 28, 29.

Substrate 9 is, for example, a semiconductor substrate such as an InP substrate.

A semiconductor stack is provided on substrate 9. The semiconductor stack includes a lower cladding layer 11, a core layer 12, and an upper cladding layer 13. MMI waveguide 10 includes lower cladding layer 11, core layer 12, and upper cladding layer 13. Lower cladding layer 11 is formed on substrate 9. Lower cladding layer 11 is, for example, an n-type InP layer. Core layer 12 is formed on lower cladding layer 11. The refractive index of core layer 12 is higher than the refractive index of lower cladding layer 11 and is higher than the refractive index of upper cladding layer 13. Core layer 12 is formed of, for example, a semiconductor material such as AlGaInAs. Core layer 12 may have, for example, a multiple quantum well (MQW) structure. Core layer 12 is, for example, an i-type semiconductor layer. Upper cladding layer 13 is formed on core layer 12. Upper cladding layer 13 is, for example, an i-type InP layer or a p-type InP layer. The semiconductor stack includes MMI waveguide 10, input waveguides 31, and output waveguides 32.

Grooves 16, 17 are formed in the semiconductor stack by etching the semiconductor stack. Grooves 16, 17 extend from the upper surface of the semiconductor stack to lower cladding layer 11. MMI waveguide 10 is formed between grooves 16, 17. MMI waveguide 10 has a high-mesa structure. Specifically, MMI waveguide 10 includes a lower surface 10a facing substrate 9, an upper surface 10b opposite to lower surface 10a, a first side surface 10c connected to upper surface 10b, and a second side surface 10d connected to upper surface 10b and opposite to first side surface 10c. First side surface 10c of MMI waveguide 10 includes a first side surface of upper cladding layer 13, a first side surface of core layer 12, and a first side surface of lower cladding layer 11. Second side surface 10d of MMI waveguide 10 includes a second side surface of upper cladding layer 13, a second side surface of core layer 12, and a second side surface of lower cladding layer 11. First side surface 10c and second side surface 10d extend in a direction of light propagation in MMI waveguide 10.

Input waveguide 31 is connected to an input end surface of MMI waveguide 10. Output waveguide 32 is connected to an output end surface of MMI waveguide 10. Each of input waveguide 31 and output waveguide 32 is configured similarly to MMI waveguide 10 and has the high-mesa structure. Each of input waveguide 31 and output waveguide 32 is, for example, a single-mode waveguide. The width of the high-mesa structure of each of input waveguide 31 and output waveguide 32 (the width of the waveguide) is smaller than the width of the high-mesa structure of MMI waveguide 10 (the width of the waveguide).

In the present embodiment, MMI waveguide 10 is a 2×2 MMI waveguide. The 2×2 MMI waveguide means an MMI waveguide with two input ports and two output ports. MMI waveguide 10 is not limited to the 2×2 MMI waveguide and may be an m×n MMI waveguide (m, n are natural numbers).

First inorganic insulating layer 18 is formed on the surface of the semiconductor stack that defines grooves 16, 17 and on upper surface 10b. First inorganic insulating layer 18 is formed on first side surface 10c, second side surface 10d, and upper surface 10b. First inorganic insulating layer 18 is formed between first side surface 10c and a first organic insulating portion 21 and between second side surface 10d and a second organic insulating portion 22. First inorganic insulating layer 18 is formed of, for example, $SiO_2$. The thickness of first inorganic insulating layer 18 is, for example, approximately 500 nm. First inorganic insulating layer 18 prevents MMI waveguide 10, input waveguides 31, and output waveguides 32 from contacting oxygen, water, or the like contained in an atmosphere surrounding semiconductor optical integrated device 1 to be oxidized or deteriorated.

Grooves 16, 17 are buried by organic insulating layer 20. Organic insulating layer 20 buries first side surface 10c and second side surface 10d. Organic insulating layer 20 includes first organic insulating portion 21 burying first side surface 10c and second organic insulating portion 22 burying second side surface 10d. In the present embodiment, upper surface 10b is exposed from organic insulating layer 20, and first organic insulating portion 21 and second organic insulating portion 22 are separated from each other. Organic insulating layer 20 prevents MMI waveguide 10, input waveguides 31, and output waveguides 32 from contacting oxygen, water, or the like contained in an atmosphere surrounding semiconductor optical integrated device 1 to be oxidized or deteriorated.

Organic insulating layer 20 is formed of, for example, a benzocyclobutene (BCB) resin or a polyimide resin. In application of semiconductor optical integrated device 1 to an optical modulator, an electrode that receives a high-frequency electric signal may be formed on organic insulating layer 20. The benzocyclobutene (BCB) resin or polyimide resin has a low dielectric constant, and thus, forming organic insulating layer 20 of the benzocyclobutene (BCB) resin or polyimide resin can widen the band of the optical modulator.

Heater layer 25 can heat organic insulating layer 20. Heater layer 25 is formed on organic insulating layer 20. Heater layer 25 includes a first heater film 26 that heats first organic insulating portion 21 and a second heater film 27 that heats second organic insulating portion 22. First heater film 26 is formed on first organic insulating portion 21. Second heater film 27 is formed on second organic insulating portion 22. Thus, an amount of heat applied to first organic insulating portion 21 and an amount of heat applied to second organic insulating portion 22 may be controlled independently of each other. Heater layer 25 is formed of, for example, a metallic thin film such as a platinum film or a titanium film, an alloy thin film such as a Nichrome film, a thin film such as an oxide or a nitride of tantalum or niobium, a stack of these thin films, or the like. Electric power (e.g., current) is supplied to heater layer 25 from an external power source (e.g., external current source).

Pad electrodes 28, 29 are formed on first inorganic insulating layer 18. Pad electrodes 28, 29 are connected to heater layer 25. Specifically, pad electrode 28 is connected to first heater film 26. Pad electrode 29 is connected to second heater film 27. A wire (not shown) connected to the external power source (e.g., external current source) is connected to pad electrodes 28, 29. Pad electrodes 28, 29 are formed of, for example, a stack of a titanium film and a gold film.

Figure 3:
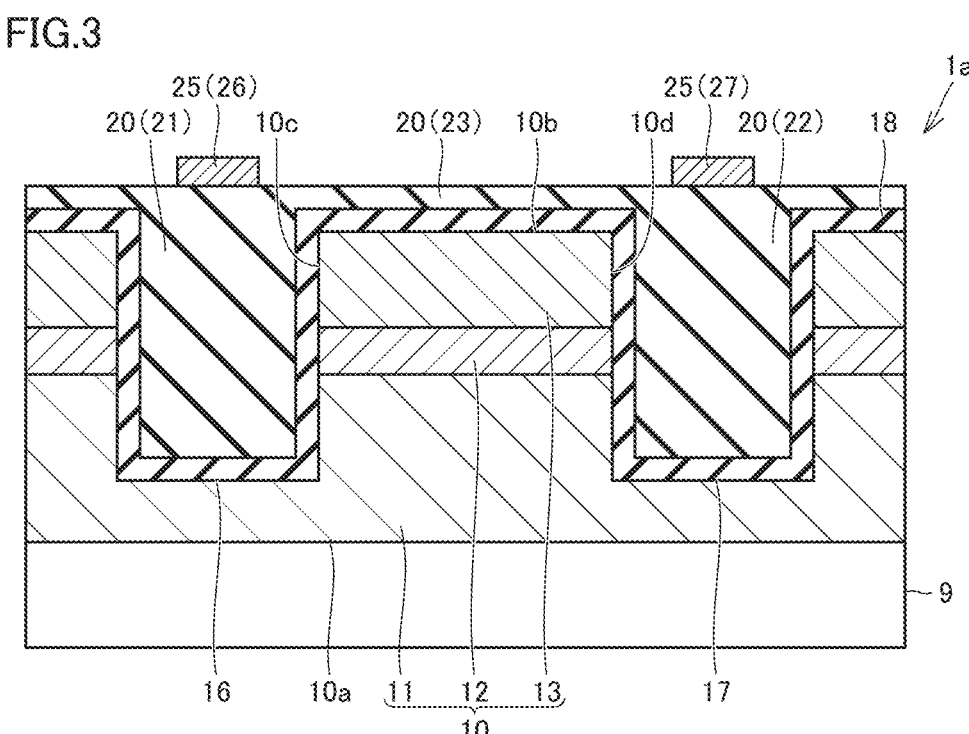
FIG. 3 is a schematic sectional view of a semiconductor optical integrated device of a variation of Embodiment 1.

Referring to FIG. 3, in a semiconductor optical integrated device 1a of a variation of the present embodiment, organic insulating layer 20 further buries upper surface 10b. Specifically, organic insulating layer 20 further includes a third organic insulating portion 23 burying upper surface 10b. Third organic insulating portion 23 is connected to first organic insulating portion 21 and second organic insulating portion 22.

Operations of semiconductor optical integrated device 1, 1a will be described. MMI waveguide 10 may be an optical splitter. Specifically, MMI waveguide 10 splits a light beam input to one of input waveguides 31 into a plurality of light beams and outputs the plurality of light beams to output waveguides 32. MMI waveguide 10 may be an optical coupler. Specifically, MMI waveguide 10 combines light beams input to input waveguides 31 and outputs a resultant light beam to one of output waveguides 32.

Figure 4:
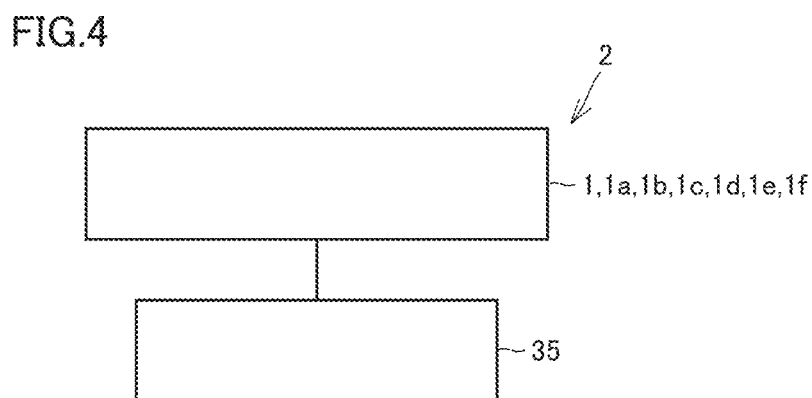
FIG. 4 is a block diagram showing an optical integrated apparatus of each of Embodiments 1 to 4.

Referring to FIG. 4, an optical integrated apparatus 2 of the present embodiment includes semiconductor optical integrated device 1 (or semiconductor optical integrated device 1a) and a controller 35. Controller 35 is, for example, a microcomputer including a processor, or an electronic circuit. Controller 35 can control electric power (e.g., current) supplied to heater layer 25.

Specifically, a first stress is applied to MMI waveguide 10 due to a difference between the coefficient of thermal expansion of MMI waveguide 10 formed of the semiconductor material and the coefficient of thermal expansion of organic insulating layer 20. The first stress may change the refractive index of MMI waveguide 10, resulting in deviations in optical characteristics of semiconductor optical integrated device 1, 1a, such as an optical branching ratio of the MMI optical splitter and an optical coupling ratio of the MMI optical coupler, from target optical characteristics of semiconductor optical integrated device 1, 1a. Also, deviations from the target optical characteristics of the semiconductor optical integrated device may be caused due to a manufacturing error of the semiconductor optical integrated device (such as a dimensional error of the MMI waveguide and a compositional deviation of the MMI waveguide).

As electric power (e.g., current) is supplied to heater layer 25, heater layer 25 heats organic insulating layer 20. Organic insulating layer 20 thermally expands to apply a second stress to MMI waveguide 10. The second stress changes the refractive index of MMI waveguide 10. The electric power supplied to heater layer 25 is controlled by controller 35. Thus, deviations in the optical characteristics of semiconductor optical integrated device 1, 1a from the target optical characteristics can be reduced or eliminated. Controller 35 may keep controlling the electric power (e.g., current) supplied to heater layer 25 such that the optical characteristics of semiconductor optical integrated device 1, 1a are kept at the target optical characteristics.

Figure 5:
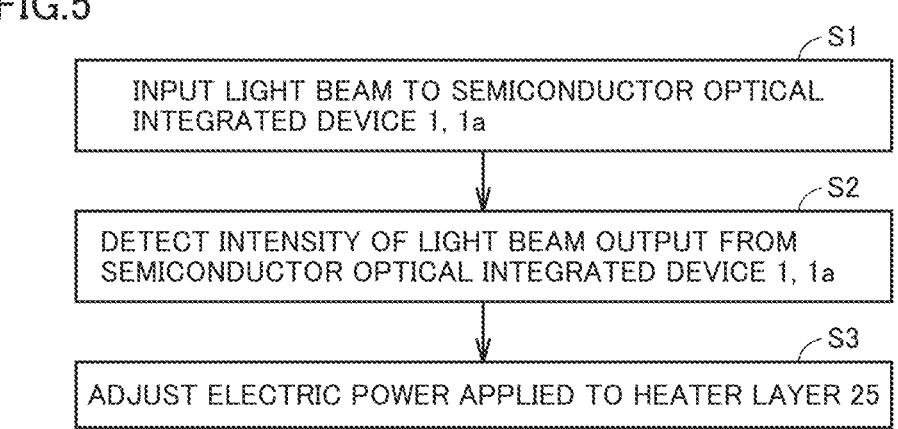
FIG. 5 is a flowchart showing a method of controlling a semiconductor optical integrated device of each of Embodiment 1 and a variation thereof.

A method of controlling semiconductor optical integrated device 1, 1a of the present embodiment will be described with reference to FIG. 5.

A light beam is input to semiconductor optical integrated device 1, 1a (S1). Specifically, a light beam emitted from a light source (not shown) is input through input waveguide 31 to an input port of MMI waveguide 10.

The intensity of the light beam output from semiconductor optical integrated device 1, 1a is detected (S2). Specifically, the light beam output from an output port of MMI waveguide 10 is detected by a photodetector (not shown) through output waveguide 32. The photodetector detects the intensity of the light beam output from output waveguide 32.

Electric power (e.g., current) applied to heater layer 25 is adjusted based on the intensity of the light beam detected by the photodetector (S3). For example, when MMI waveguide 10 is an optical splitter, controller 35 controls electric power applied to heater layer 25 such that the light beams output from output waveguides 32 have the same intensity. For example, when MMI waveguide 10 is an optical coupler, electric power applied to heater layer 25 is controlled such that the light beam output from one of output waveguides 32 has the highest intensity. This can reduce or eliminate deviations in the optical characteristics of semiconductor optical integrated device 1, 1a from the target optical characteristics. Controller 35 may keep controlling the electric power (e.g., current) supplied to heater layer 25 such that the optical characteristics of semiconductor optical integrated device 1, 1a are kept at the target optical characteristics.

The effects of semiconductor optical integrated device 1, 1a of the present embodiment will be described.

Semiconductor optical integrated device 1, 1a of the present embodiment includes substrate 9, multi-mode interference (MMI) waveguide 10, organic insulating layer 20, and heater layer 25. MMI waveguide 10 is provided on substrate 9 and is formed of a semiconductor material. MMI waveguide 10 is connected to lower surface 10a facing substrate 9, upper surface 10b opposite to lower surface 10a, first side surface 10c connected to upper surface 10b, and second side surface 10d connected to upper surface 10b and opposite to first side surface 10c. Organic insulating layer 20 buries first side surface 10c and second side surface 10d. Heater layer 25 can heat organic insulating layer 20.

A first stress due to a difference between the coefficient of thermal expansion of MMI waveguide 10 formed of the semiconductor material and the coefficient of thermal expansion of organic insulating layer 20 may be applied to MMI waveguide 10. The first stress may change the refractive index of MMI waveguide 10, resulting in deviations in optical characteristics of semiconductor optical integrated device 1, 1a from the target optical characteristics of semiconductor optical integrated device 1, 1a. However, as organic insulating layer 20 is heated with heater layer 25, organic insulating layer 20 thermally expands to apply a second stress to MMI waveguide 10. The second stress changes the refractive index of MMI waveguide 10. This can reduce or eliminate deviations in the optical characteristics of semiconductor optical integrated device 1, 1a from the target optical characteristics.

In semiconductor optical integrated device 1, 1a of the present embodiment, organic insulating layer 20 includes first organic insulating portion 21 burying first side surface 10c and second organic insulating portion 22 burying second side surface 10d. Heater layer 25 includes first heater film 26 that heats first organic insulating portion 21 and second heater film 27 that heats second organic insulating portion 22.

Thus, the amount of heat applied to first organic insulating portion 21 and the amount of heat applied to second organic insulating portion 22 can be controlled independently of each other. The magnitude and distribution of the second stress based on heating of organic insulating layer 20 by heater layer 25 can be adjusted more finely. This can further reduce or eliminate deviations in the optical characteristics of semiconductor optical integrated device 1, 1a from the target optical characteristics.

In semiconductor optical integrated device 1, 1a of the present embodiment, first heater film 26 is formed on first organic insulating portion 21. Second heater film 27 is formed on second organic insulating portion 22. This can further reduce or eliminate deviations in the optical characteristics of semiconductor optical integrated device 1, 1a from the target optical characteristics.

Semiconductor optical integrated device 1, 1a of the present embodiment further includes first inorganic insulating layer 18. First inorganic insulating layer 18 is formed on first side surface 10c, second side surface 10d, and upper surface 10b. First inorganic insulating layer 18 is formed between first side surface 10c and first organic insulating portion 21 and between second side surface 10d and second organic insulating portion 22.

First inorganic insulating layer 18 prevents MMI waveguide 10 from contacting oxygen, water, or the like contained in an atmosphere surrounding semiconductor optical integrated device 1, 1a to be oxidized or deteriorated. This can reduce or eliminate deviations in the optical characteristics of semiconductor optical integrated device 1, 1a from the target optical characteristics.

In semiconductor optical integrated device 1a of the present embodiment, organic insulating layer 20 further includes third organic insulating portion 23. Third organic insulating portion 23 buries upper surface 10b and is connected to first organic insulating portion 21 and second organic insulating portion 22.

Organic insulating layer 20 prevents MMI waveguide 10 from contacting oxygen, water, or the like contained in an atmosphere surrounding semiconductor optical integrated device 1a to be oxidized or deteriorated. This can reduce or eliminate deviations in the optical characteristics of semiconductor optical integrated device 1a from the target optical characteristics.

Optical integrated apparatus 2 of the present embodiment includes semiconductor optical integrated device 1, 1a and controller 35 that can control electric power supplied to heater layer 25. This can reduce or eliminate deviations in the optical characteristics of optical integrated apparatus 2 from the target optical characteristics.

Embodiment 2

Figures 6, 7:
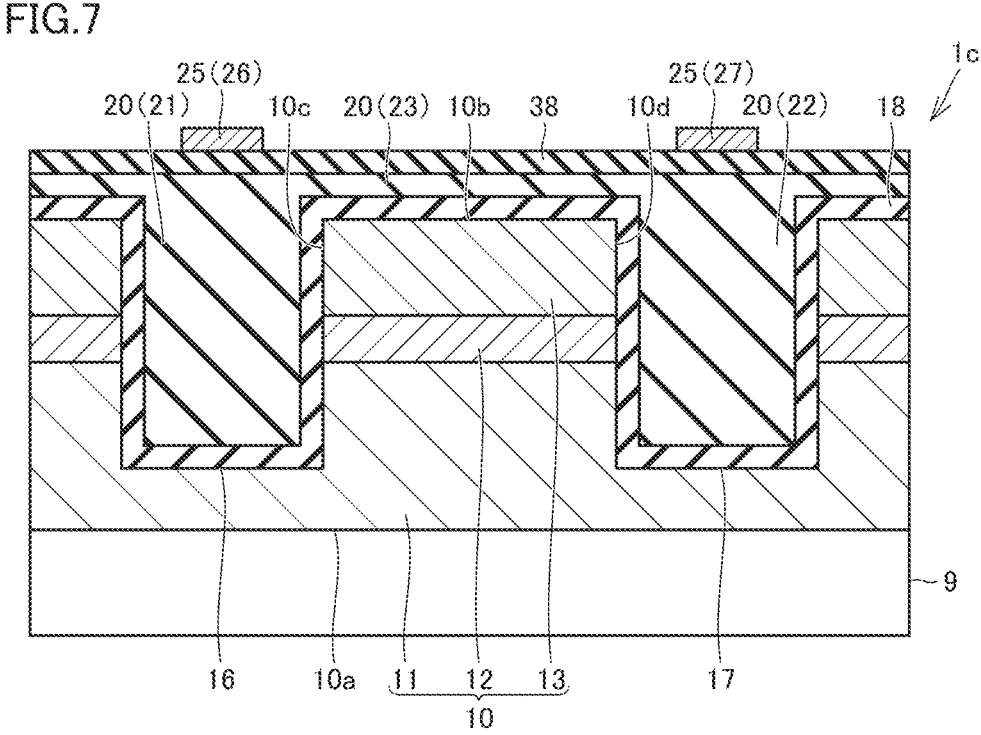
FIG. 6 is a schematic sectional view of a semiconductor optical integrated device of Embodiment 2.
FIG. 7 is a schematic sectional view of a semiconductor optical integrated device of a variation of Embodiment 2.

A semiconductor optical integrated device 1b of Embodiment 2 will be described with reference to FIG. 6. Semiconductor optical integrated device 1b of the present embodiment has a similar structure to that of semiconductor optical integrated device 1 of Embodiment 1 but is different mainly in the following point.

Semiconductor optical integrated device 1b further includes a second inorganic insulating layer 38. Second inorganic insulating layer 38 is formed on organic insulating layer 20 (first organic insulating portion 21 and second organic insulating portion 22). Second inorganic insulating layer 38 may be formed also on first inorganic insulating layer 18. Second inorganic insulating layer 38 is formed of, for example, $SiO_2$. The thickness of second inorganic insulating layer 38 is, for example, approximately 500 nm. Second inorganic insulating layer 38 prevents organic insulating layer 20 from contacting oxygen, water, or the like contained in an atmosphere surrounding semiconductor optical integrated device 1b to be deteriorated. Heater layer 25 is formed on second inorganic insulating layer 38.

A semiconductor optical integrated device 1c of a variation of the present embodiment will be described with reference to FIG. 7. Semiconductor optical integrated device 1c further includes second inorganic insulating layer 38 in semiconductor optical integrated device 1a of the variation of Embodiment 1. Second inorganic insulating layer 38 is formed on first organic insulating portion 21, second organic insulating portion 22, and third organic insulating portion 23. Heater layer 25 is formed on second inorganic insulating layer 38.

Referring to FIG. 4, optical integrated apparatus 2 of the present embodiment includes semiconductor optical integrated device 1b (or semiconductor optical integrated device 1c) and controller 35. A method of controlling semiconductor optical integrated device 1b, 1c of the present embodiment is the same as the method of controlling semiconductor optical integrated device 1, 1a of Embodiment 1 shown in FIG. 5.

Semiconductor optical integrated device 1b, 1c of the present embodiment exhibits the following effects in addition to the effects of semiconductor optical integrated device 1, 1a of Embodiment 1.

Semiconductor optical integrated device 1b, 1c of the present embodiment further includes second inorganic insulating layer 38 formed on first organic insulating portion 21 and second organic insulating portion 22. Heater layer 25 is formed on second inorganic insulating layer 38.

Second inorganic insulating layer 38 prevents organic insulating layer 20 from contacting oxygen, water, or the like contained in an atmosphere surrounding semiconductor optical integrated device 1b, 1c to be deteriorated. This can further reduce or eliminate deviations in the optical characteristics of semiconductor optical integrated device 1b, 1c from the target optical characteristics.

Embodiment 3

Figure 8:
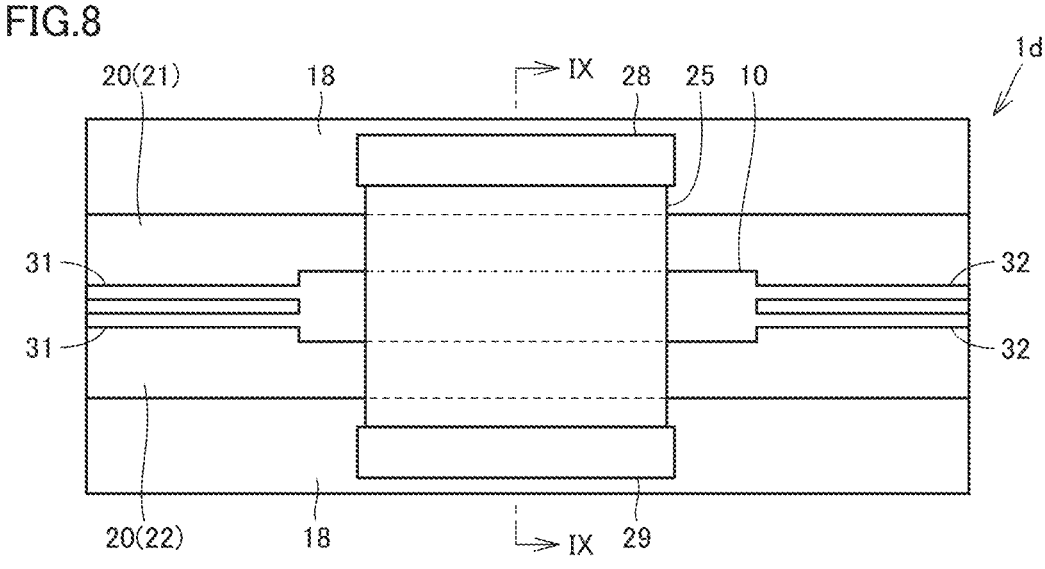
FIG. 8 is a schematic plan view of a semiconductor optical integrated device of Embodiment 3.
Figure 9:
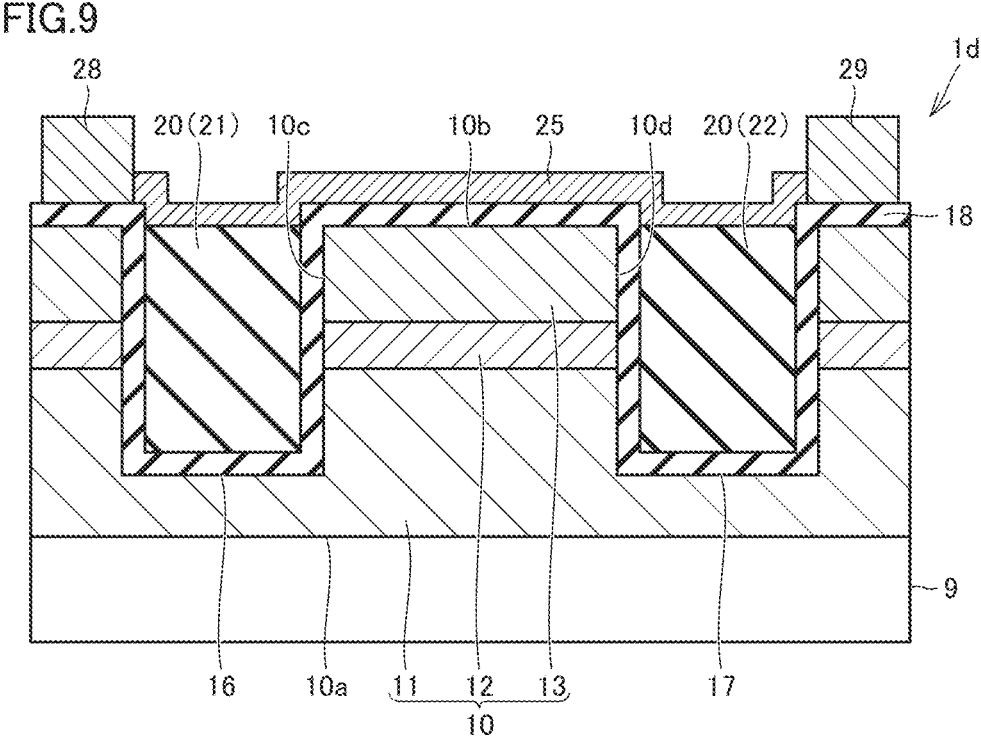
FIG. 9 is a schematic sectional view of the semiconductor optical integrated device of Embodiment 3, which is taken along the sectional line IX-IX shown in FIG. 8.

A semiconductor optical integrated device 1d of Embodiment 3 will be described with reference to FIGS. 8 and 9. Semiconductor optical integrated device 1d of the present embodiment has a similar structure to that of semiconductor optical integrated device 1 of Embodiment 1 but is different mainly in the following point.

In semiconductor optical integrated device 1d, heater layer 25 is formed continuously over first organic insulating portion 21 and second organic insulating portion 22. Heater layer 25 is connected to pad electrodes 28, 29.

Referring to FIG. 4, optical integrated apparatus 2 of the present embodiment includes semiconductor optical integrated device 1d and controller 35. A method of controlling semiconductor optical integrated device 1d of the present embodiment is the same as the method of controlling semiconductor optical integrated device 1, 1a of Embodiment 1 shown in FIG. 5.

Semiconductor optical integrated device 1d of the present embodiment exhibits the following effects in addition to the effects of semiconductor optical integrated device 1 of Embodiment 1.

In semiconductor optical integrated device 1d of the present embodiment, organic insulating layer 20 includes first organic insulating portion 21 burying first side surface 10c and second organic insulating portion 22 burying second side surface 10d. Heater layer 25 is formed continuously over first organic insulating portion 21 and second organic insulating portion 22.

Thus, a process of manufacturing heater layer 25 is simplified. A manufacturing cost of semiconductor optical integrated device 1d can be reduced.

Embodiment 4

Figure 10:
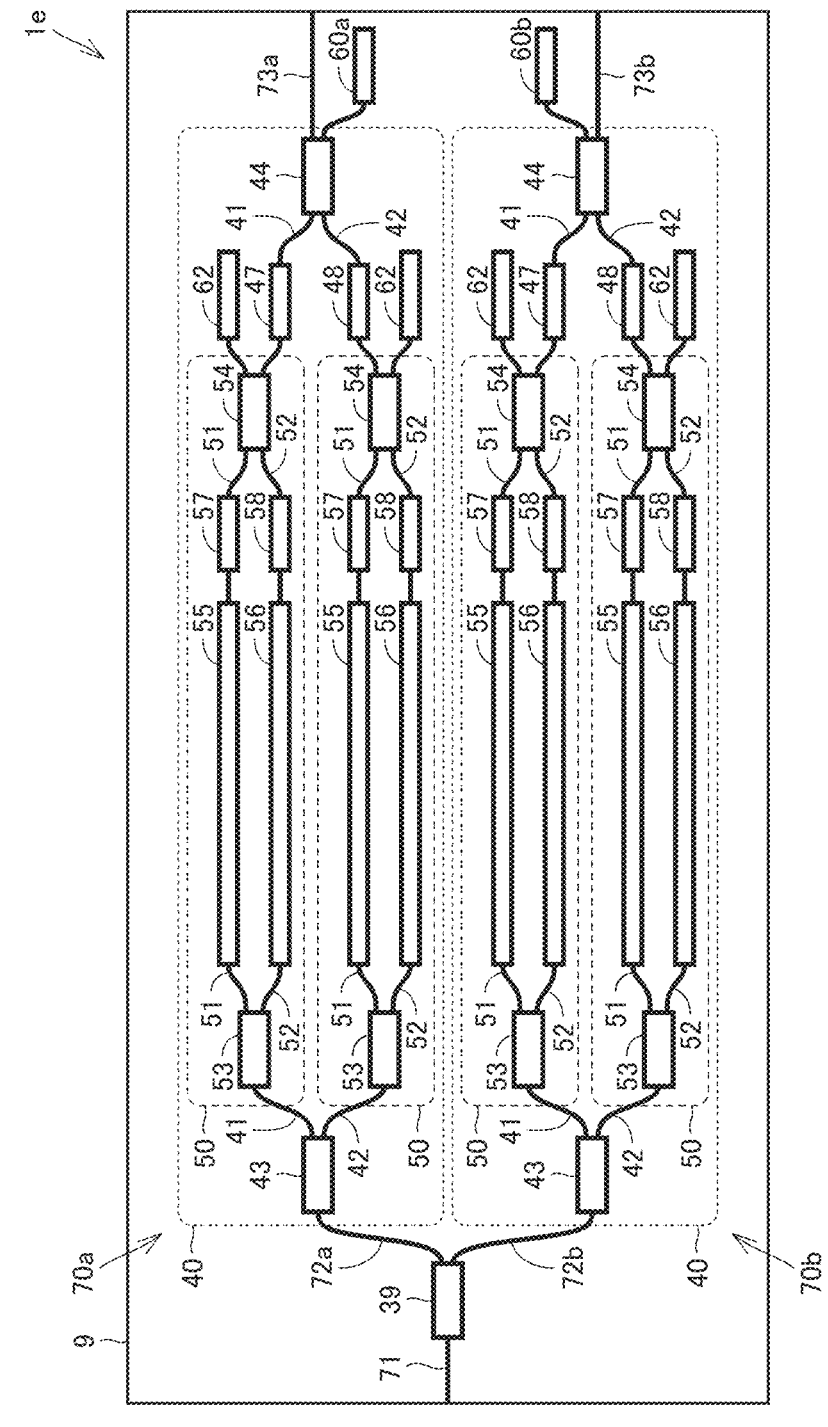
FIG. 10 is a schematic plan view of a semiconductor optical integrated device of Embodiment 4.

A semiconductor optical integrated device 1e of Embodiment 4 will be described with reference to FIG. 10. Semiconductor optical integrated device 1e is a multivalued optical phase modulator that outputs a multilevel optical signal with two or more values. Examples of the multilevel optical signal with two or more values include a quadrature phase shift keying (QPSK) signal and a dual-polarization quadrature phase shift keying (DP-QPSK) signal. In the present embodiment, semiconductor optical integrated device 1e is a DP-QPSK optical phase modulator. Semiconductor optical integrated device 1e mainly includes substrate 9, an input waveguide 71, an optical splitter 39, waveguides 72a, 72b, optical phase modulators 70a, 70b, output waveguides 73a, 73b, and monitoring photodiodes 60a, 60b, 62.

Substrate 9 is the same as substrate 9 of Embodiment 1. Input waveguide 71, optical splitter 39, waveguides 72a, 72b, optical phase modulators 70a, 70b, output waveguides 73a, 73b, and monitoring photodiodes 60a, 60b, 62 are formed on substrate 9.

Optical splitter 39 includes an input port, a first output port, and a second output port. Optical splitter 39 is, for example, a 1×2 MMI splitter. Input waveguide 71 is connected to the input port of optical splitter 39. Waveguide 72a is connected to the first output port of optical splitter 39. Waveguide 72b is connected to the second output port of optical splitter 39.

Optical phase modulator 70a functions as a QPSK optical phase modulator. Optical phase modulator 70a includes a parent Mach-Zehnder interferometer 40, two child Mach-Zehnder interferometers 50, phase modulation units 55, 56, parent phase adjustment units 47, 48, and child phase adjustment units 57, 58.

Parent Mach-Zehnder interferometer 40 includes two first arm waveguides 41, 42, an optical splitter 43, and an optical coupler 44.

Optical splitter 43 of optical phase modulator 70a is connected to waveguide 72a and two first arm waveguides 41, 42. Optical splitter 43 is, for example, a 1×2 MMI splitter. An input port of optical splitter 43 is connected to waveguide 72a. Two output ports of optical splitter 43 are connected to two first arm waveguides 41, 42. Optical splitter 43 further splits a light beam split by optical splitter 39 and outputs resultant light beams to two first arm waveguides 41, 42.

Optical coupler 44 of optical phase modulator 70a is connected to two first arm waveguides 41, 42 and output waveguide 73a. Optical coupler 44 is, for example, a 2×2 MMI coupler. Two input ports of optical coupler 44 are connected to two first arm waveguides 41, 42. One of two output ports of optical coupler 44 is connected to output waveguide 73a. Optical coupler 44 combines the light beams propagating through two first arm waveguides 41, 42 and outputs a resultant light beam to output waveguide 73a.

Two child Mach-Zehnder interferometers 50 are respectively connected to two first arm waveguides 41, 42. Child Mach-Zehnder interferometer 50 and phase modulation units 55, 56 connected to first arm waveguide 41 constitute, for example, a Mach-Zehnder optical phase modulator for I channel. Child Mach-Zehnder interferometer 50 and phase modulation units 55, 56 connected to first arm waveguide 42 constitute, for example, a Mach-Zehnder optical phase modulator for Q channel. Each child Mach-Zehnder interferometer 50 includes two second arm waveguides 51, 52, an optical splitter 53, and an optical coupler 54.

Optical splitter 53 is connected to one of two first arm waveguides 41, 42 and two second arm waveguides 51, 52. Optical splitter 53 is, for example, a 1×2 MMI splitter. An input port of optical splitter 53 is connected to one of two first arm waveguides 41, 42. Two output ports of optical splitter 53 are connected to two second arm waveguides 51, 52. Optical splitter 53 further splits the light beam split by optical splitter 43 and outputs resultant light beams to two second arm waveguides 51, 52.

Optical coupler 54 is connected to two second arm waveguides 51, 52 and one of two first arm waveguides 41, 42. Optical coupler 54 is, for example, a 2×2 MMI coupler. Two input ports of optical coupler 44 are connected to two second arm waveguides 51, 52. One of the two output ports of optical coupler 44 is connected to one of two first arm waveguides 41, 42. Optical coupler 54 combines the light beams propagating through two second arm waveguides 51, 52 and outputs a resultant light beam to one of two first arm waveguides 41, 42.

Phase modulation units 55, 56 are provided in two second arm waveguides 51, 52. Specifically, phase modulation unit 55 is provided in second arm waveguide 51. Phase modulation unit 56 is provided in second arm waveguide 52. Each of phase modulation units 55, 56 includes an electrode (not shown) in addition to lower cladding layer 11, core layer 12, and upper cladding layer 13.

Parent phase adjustment units 47, 48 are provided in two first arm waveguides 41, 42. Specifically, parent phase adjustment unit 47 is provided in first arm waveguide 41. Parent phase adjustment unit 48 is provided in first arm waveguide 42. Parent phase adjustment unit 47, 48 has a similar structure to that of phase modulation unit 55, 56. Each of parent phase adjustment units 47, 48 includes an electrode (not shown) in addition to lower cladding layer 11, core layer 12, and upper cladding layer 13. For example, phases provided to an I-channel optical signal output from first arm waveguide 41 and a Q-channel optical signal output from first arm waveguide 42 are adjusted in parent phase adjustment units 47, 48 such that a phase difference between the I-channel optical signal and the Q-channel optical signal is π/2 at the input port of optical coupler 44.

Child phase adjustment units 57, 58 are provided in two second arm waveguides 51, 52. Specifically, child phase adjustment unit 57 is provided in second arm waveguide 51. Child phase adjustment unit 58 is provided in second arm waveguide 52. Child phase adjustment unit 57, 58 has a similar structure to that of phase modulation unit 55, 56. Each of child phase adjustment units 57, 58 includes an electrode (not shown) in addition to lower cladding layer 11, core layer 12, and upper cladding layer 13.

Optical phase modulator 70b also functions as a QPSK optical phase modulator. Optical phase modulator 70b is configured similarly to optical phase modulator 70a. Optical splitter 43 of optical phase modulator 70b is connected to waveguide 72b and two first arm waveguides 41, 42. Optical coupler 44 of optical phase modulator 70b is connected to two first arm waveguides 41, 42 and output waveguide 73b.

Monitoring photodiode 60a is optically coupled to the other of the two output ports of optical coupler 44 of optical phase modulator 70a. Monitoring photodiode 60a detects the intensity of a light beam output from the other of the two output ports of optical coupler 44 of optical phase modulator 70a. Monitoring photodiode 60b is optically coupled to the other of the two output ports of optical coupler 44 of optical phase modulator 70b. Monitoring photodiode 60b detects the intensity of a light beam output from the other of the two output ports of optical coupler 44 of optical phase modulator 70b. Monitoring photodiode 62 is optically coupled to the other of two output ports of optical coupler 54. Monitoring photodiode 62 detects the intensity of a light beam output from the other of the two output ports of optical coupler 54.

In the present embodiment, optical splitter 43, 53 has the same structure as that of any of semiconductor optical integrated devices 1, 1a, 1b, 1c, 1d of Embodiments 1 to 3 and the variations thereof. In other words, optical splitter 43, 53 includes organic insulating layer 20 and heater layer 25. Optical coupler 44, 54 has a similar structure to that of any of semiconductor optical integrated devices 1, 1a, 1b, 1c, 1d of Embodiments 1 to 3 and the variations thereof but does not include heater layer 25. Each of input waveguide 71, waveguides 72a, 72b, two first arm waveguides 41, 42, two second arm waveguides 51, 52, and output waveguides 73a, 73b has the same structure as that of a corresponding one of input waveguide 31 and output waveguide 32 of Embodiment 1.

Figure 11:
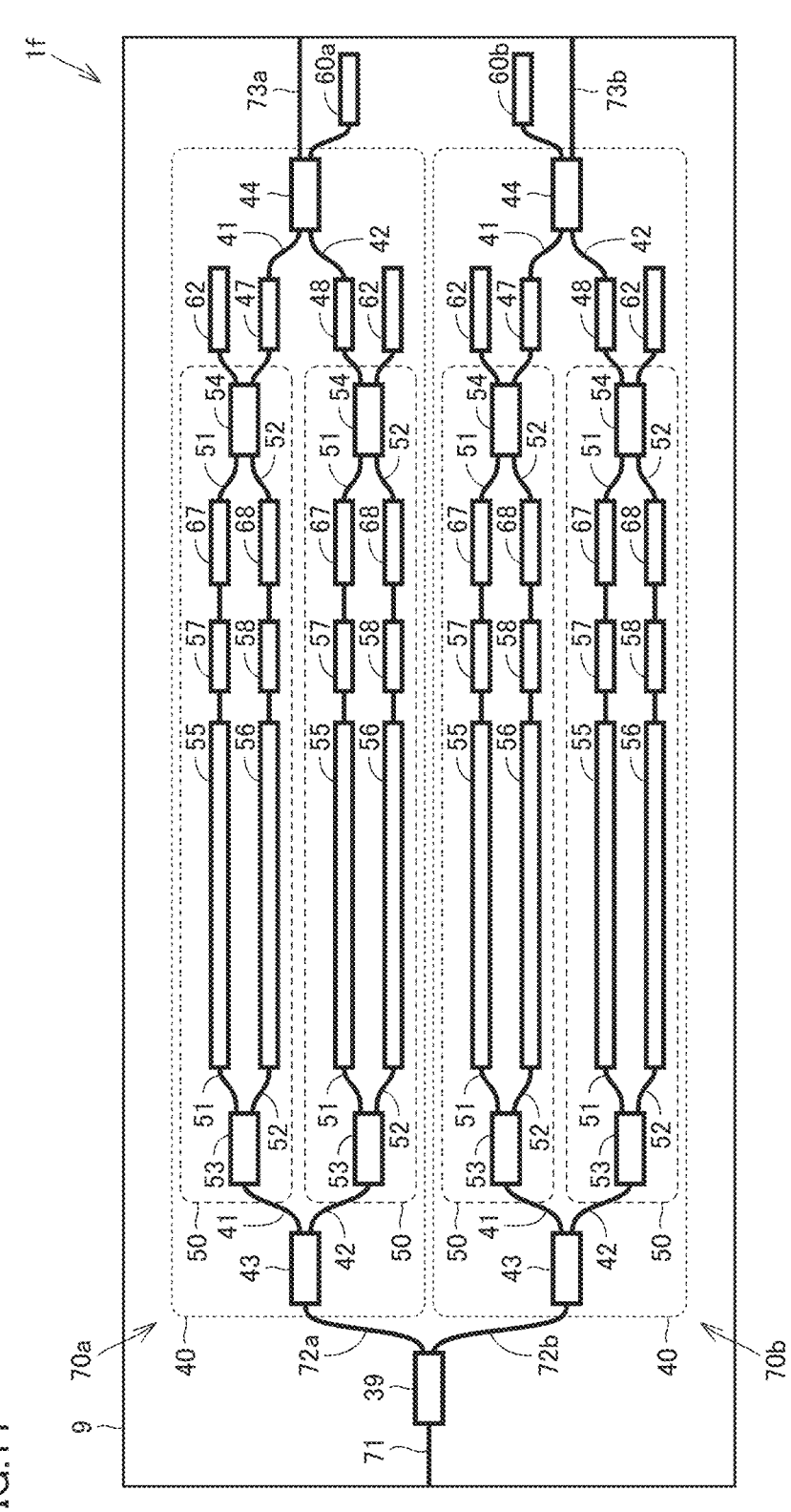
FIG. 11 is a schematic plan view of a semiconductor optical integrated device of a variation of Embodiment 4.

Referring to FIG. 11, a semiconductor optical integrated device 1f of a variation of the present embodiment further includes monitoring photodiodes 67, 68. Monitoring photodiodes 67, 68 are provided in two second arm waveguides 51, 52. Monitoring photodiodes 67, 68 detect the intensities of part of two light beams propagating through two second arm waveguides 51, 52. The remaining parts of the two light beams propagating through second arm waveguides 51, 52 pass through monitoring photodiodes 67, 68.

Specifically, monitoring photodiode 67 is provided in one (second arm waveguide 51) of two second arm waveguides 51, 52. Monitoring photodiode 67 detects the intensity of part of the light beam propagating through one of two second arm waveguides 51, 52. The remaining part of the light beam propagating through one of two second arm waveguides 51, 52 passes through monitoring photodiode 67. Monitoring photodiode 68 is provided in the other (second arm waveguide 52) of two second arm waveguides 51, 52. Monitoring photodiode 68 detects the intensity of part of the light beam propagating through the other of two second arm waveguides 51, 52. The remaining part of the light beam propagating through the other of two second arm waveguides 51, 52 passes through monitoring photodiode 68.

Referring to FIG. 4, optical integrated apparatus 2 of the present embodiment includes semiconductor optical integrated device 1e (or semiconductor optical integrated device 1f) and controller 35. Controller 35 can control electric power (e.g., current) supplied to heater layer 25, voltages applied to phase modulation units 55, 56, voltages applied to parent phase adjustment units 47, 48, and voltages applied to child phase adjustment units 57, 58. Controller 35 controls electric power supplied to heater layer 25 based on the intensity of the light beam detected by monitoring photodiode 60a, 60b, 62 or based on the intensity of the light beam detected by monitoring photodiode 60a, 60b, 67, 68.

Operations of semiconductor optical integrated device 1e, 1f of the present embodiment will be described.

A high-frequency electric signal is applied to phase modulation unit 55, 56, thereby changing the refractive index of core layer 12 of phase modulation unit 55, 56. A first optical signal is output from output waveguide 73a of optical phase modulator 70a, and a second optical signal is output from output waveguide 73b of optical phase modulator 70b. On the output side of semiconductor optical integrated device 1e, 1f, a polarization rotator (not shown) and a polarization beam combiner (not shown) are disposed. One of the first optical signal and the second optical signal passes through the polarization rotator, so that the direction of polarization rotates 90°. The other of the first optical signal and the second optical signal enters the polarization beam combiner without passing through the polarization rotator. The polarization beam combiner combines one of the first optical signal and the second optical signal, the direction of polarization of which is rotated, and the other of the first optical signal and the second optical signal, and then outputs a DP-QPSK signal.

A method of controlling semiconductor optical integrated device 1e of the present embodiment will be described with reference to FIG. 12. An example of the target optical characteristics of semiconductor optical integrated device 1e is that no light beam is output from output waveguide 73a, 73b when no electric signal is applied to phase modulation unit 55, 56. When the optical characteristics of semiconductor optical integrated device 1e satisfy the target optical characteristics, an S/N ratio of semiconductor optical integrated device 1e can become maximum. The S/N ratio of semiconductor optical integrated device 1e is provided as the ratio of the intensity of an optical signal output from semiconductor optical integrated device 1e when an electric signal is applied to phase modulation unit 55, 56 to the intensity (noise intensity) of a light beam output from semiconductor optical integrated device 1e when no electric signal is applied to phase modulation unit 55, 56.

Specifically, a light beam is input to semiconductor optical integrated device 1e (S11). Step S11 is similar to step S1. Specifically, a light beam emitted from a light source (not shown) is input to input waveguide 71.

Based on the intensity of a light beam detected by monitoring photodiode 62, a voltage applied to child phase adjustment unit 57, 58 is adjusted (S12). For example, controller 35 adjusts a voltage applied to child phase adjustment unit 57, 58 such that the light beam detected by monitoring photodiode 62 has the highest intensity when no electric signal is applied to phase modulation unit 55, 56.

Based on the intensity of the light beam detected by monitoring photodiode 62, electric power (e.g., current) applied to heater layer 25 of optical splitter 53 is adjusted (S13). For example, controller 35 controls electric power (e.g., current) applied to heater layer 25 of optical splitter 53 such that the light beam detected by monitoring photodiode 62 has the highest intensity when no electric signal is applied to phase modulation unit 55, 56. Any of steps S12 and S13 may be performed first. Steps S12 and S13 may be performed repeatedly.

Based on the intensity of a light beam detected by monitoring photodiode 60a, 60b, a voltage applied to parent phase adjustment unit 47, 48 is adjusted (S14). For example, controller 35 adjusts a voltage applied to parent phase adjustment unit 47, 48 such that the light beam detected by monitoring photodiode 60a, 60b has the highest intensity when no electric signal is applied to phase modulation unit 55, 56.

Based on the intensity of the light beam detected by monitoring photodiode 60a, 60b, electric power (e.g., current) applied to heater layer 25 of optical splitter 43 is adjusted (S15). For example, controller 35 controls electric power (e.g., current) applied to heater layer 25 of optical splitter 43 such that the light beam detected by monitoring photodiode 60a, 60b has the highest intensity when no electric signal is applied to phase modulation unit 55, 56. Any of steps S14 and S15 may be performed first. Steps S14 and S15 may be performed repeatedly.

Thus, deviations in the optical characteristics of semiconductor optical integrated device 1e from the target optical characteristics can be reduced or eliminated.

As shown in FIG. 12, a method of controlling semiconductor optical integrated device 1f of the variation of the present embodiment is similar to the method of controlling semiconductor optical integrated device 1e of the present embodiment, but the methods are different from each other in the following point.

Based on the intensity of a light beam detected by monitoring photodiode 67, 68, electric power (e.g., current) applied to heater layer 25 of optical splitter 53 is adjusted (S13). For example, controller 35 controls electric power (e.g., current) applied to heater layer 25 of optical splitter 53 such that the intensity of the light beam detected by monitoring photodiode 67 is equal to the intensity of a light beam detected by monitoring photodiode 68 when no electric signal is applied to phase modulation unit 55, 56.

Semiconductor optical integrated device 1e, If of the present embodiment exhibits the following effects in addition to the effects of semiconductor optical integrated device 1 of Embodiment 1.

Semiconductor optical integrated device 1e, If of the present embodiment further includes a monitoring photodiode (e.g., at least one of monitoring photodiodes 60a, 60b, 62, 67, 68) that detects the intensity of a light beam output from multi-mode interference waveguide 10.

An amount of heat applied to organic insulating layer 20 can be adjusted based on the intensity of the light beam detected by the monitoring photodiode (e.g., at least one of monitoring photodiodes 60a, 60b, 62, 67, 68). Deviations in the optical characteristics of semiconductor optical integrated device 1e, If from the target optical characteristics can be reduced or eliminated.

Semiconductor optical integrated device 1e, 1f of the present embodiment further includes two arm waveguides (two first arm waveguides 41, 42 or two second arm waveguides 51, 52) connected to multi-mode interference waveguide 10 and an optical coupler (optical coupler 44 or optical coupler 54) connected to the two arm waveguides. Multi-mode interference waveguide 10 is an optical splitter (optical splitter 43 or optical splitter 53). The monitoring photodiode (e.g., at least one of monitoring photodiodes 60a, 60b, 62, 67, 68) detects a first intensity of a first light beam output from the optical coupler or detects a second intensity of a second light beam propagating through each of the two arm waveguides.

The amount of heat applied to organic insulating layer 20 can be adjusted based on the intensity of the light beam detected by the monitoring photodiode (e.g., at least one of monitoring photodiodes 60a, 60b, 62, 67, 68). Deviations in the optical characteristics of semiconductor optical integrated device 1e, 1f from the target optical characteristics can be reduced or eliminated.

It should be understood that Embodiments 1 to 4 and the variations thereof disclosed herein have been presented for the purpose of illustration and non-restrictive in every respect. At least two of Embodiments 1 to 4 and the variations thereof disclosed herein may be combined as long as there is no inconsistency. It is therefore intended that the scope of the present disclosure is defined by claims, not only by the description above, and encompasses all modifications and variations equivalent in meaning and scope to the claims.

REFERENCE SIGNS LIST 1, 1a, 1b, 1c, 1d, 1e, 1f semiconductor optical integrated device; 2 optical integrated apparatus; 9 substrate; 10 multi-mode interference waveguide; 10a lower surface; 10b upper surface; 10c first side surface; 10d second side surface; 11 lower cladding layer; 12 core layer; 13 upper cladding layer; 16, 17 groove; 18 first inorganic insulating layer; 20 organic insulating layer; 21 first organic insulating portion; 22 second organic insulating portion; 23 third organic insulating portion; 25 heater layer; 26 first heater film; 27 second heater film; 28, 29 pad electrode; 31 input waveguide; 32 output waveguide; 35 controller; 38 second inorganic insulating layer; 39 optical splitter; 40 parent Mach-Zehnder interferometer; 41, 42 first arm waveguide; 43, 53 optical splitter; 44, 54 optical coupler; 47, 48 parent phase adjustment unit; 50 child Mach-Zehnder interferometer; 51, 52 second arm waveguide; 55, 56 phase modulation unit; 57, 58 child phase adjustment unit; 60a, 60b, 62, 67, 68 monitoring photodiode; 71 input waveguide; 70a, 70b optical phase modulator; 72a, 72b waveguide; 73a, 73b output waveguide.

The invention claimed is:

1. A semiconductor optical integrated device that propagates an optical signal in an input/output direction from a first end to a second end using a multi-mode interference waveguide on a semiconductor substrate, the semiconductor optical integrated device comprising:
   an organic insulating layer disposed on the semiconductor substrate to extend in the input/output direction; and
   a heater layer to heat the organic insulating layer, wherein
   the multi-mode interference waveguide includes
   a lower surface facing the semiconductor substrate,
   an upper surface opposite to the lower surface,
   a first side surface connected to the upper surface, and
   a second side surface connected to the upper surface and opposite to the first side surface,
   the organic insulating layer includes
   a first organic insulating portion burying the first side surface, and
   a second organic insulating portion burying the second side surface,
   the heater layer includes
   a first heater film to heat the first organic insulating portion, and
   a second heater film to heat the second organic insulating portion,
   the semiconductor optical integrated device further comprises a first inorganic insulating layer formed on the first side surface, the second side surface, and the upper surface, and
   the first inorganic insulating layer is formed between the first side surface and the first organic insulating portion and between the second side surface and the second organic insulating portion.

2. The semiconductor optical integrated device according to claim 1, wherein
   the first heater film is formed on the first organic insulating portion, and
   the second heater film is formed on the second organic insulating portion.

3. The semiconductor optical integrated device according to claim 1, wherein
   the heater layer is formed continuously over the first organic insulating portion and the second organic insulating portion.

4. The semiconductor optical integrated device according to claim 1,
   wherein the organic insulating layer further includes a third organic insulating portion burying the upper surface and connected to the first organic insulating portion and the second organic insulating portion.

5. A semiconductor optical integrated device that propagates an optical signal in an input/output direction from a first end to a second end using a multi-mode interference waveguide on a semiconductor substrate, the semiconductor optical integrated device comprising:

an organic insulating layer disposed on the semiconductor substrate to extend in the input/output direction; and a heater layer to heat the organic insulating layer, wherein the multi-mode interference waveguide includes a lower surface facing the semiconductor substrate, an upper surface opposite to the lower surface, a first side surface connected to the upper surface, and a second side surface connected to the upper surface and opposite to the first side surface, the organic insulating layer includes a first organic insulating portion burying the first side surface, and a second organic insulating portion burying the second side surface, the heater layer includes a first heater film to heat the first organic insulating portion, and a second heater film to heat the second organic insulating portion, the semiconductor optical integrated device further comprises an inorganic insulating layer formed on the first organic insulating portion and the second organic insulating portion, and the heater layer is formed on the inorganic insulating layer.

6. The semiconductor optical integrated device according to claim 1, wherein the multi-mode interference waveguide is a 2×2 multi-mode interference waveguide.

7. The semiconductor optical integrated device according to claim 1, wherein the organic insulating layer is formed of a benzocyclobutene resin or a polyimide resin.

8. The semiconductor optical integrated device according to claim 1, further comprising a monitoring photodiode to detect an intensity of a light beam output from the multimode interference waveguide.

9. The semiconductor optical integrated device according to claim 8, further comprising:

two arm waveguides connected to the multi-mode interference waveguide; and an optical coupler connected to the two arm waveguides, wherein the multi-mode interference waveguide is an optical splitter, and the monitoring photodiode detects a first intensity of a first light beam output from the optical coupler or detects a second intensity of each of two second light beams propagating through the two arm waveguides.

10. An optical integrated apparatus comprising:

the semiconductor optical integrated device according to claim 1; and a controller capable of controlling electric power supplied to the heater layer.

11. The semiconductor optical integrated device according to claim 5, wherein the multi-mode interference waveguide is a 2×2 multi-mode interference waveguide.

12. The semiconductor optical integrated device according to claim 5, wherein the organic insulating layer is formed of a benzocyclobutene resin or a polyimide resin.

13. The semiconductor optical integrated device according to claim 5, further comprising a monitoring photodiode to detect an intensity of a light beam output from the multi-mode interference waveguide.

14. The semiconductor optical integrated device according to claim 13, further comprising:

two arm waveguides connected to the multi-mode interference waveguide; and an optical coupler connected to the two arm waveguides, wherein the multi-mode interference waveguide is an optical splitter, and the monitoring photodiode detects a first intensity of a first light beam output from the optical coupler or detects a second intensity of each of two second light beams propagating through the two arm waveguides.

15. An optical integrated apparatus comprising:

the semiconductor optical integrated device according to claim 5; and a controller capable of controlling electric power supplied to the heater layer.

* * * * *